(12) United States Patent
Chien

(10) Patent No.: US 6,807,227 B2
(45) Date of Patent: Oct. 19, 2004

(54) METHOD OF RECONFIGURATION OF RADIO PARAMETERS FOR POWER-AWARE AND ADAPTIVE COMMUNICATIONS

(75) Inventor: Charles Chien, Newbury Park, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 22 days.

(21) Appl. No.: 10/055,261

(22) Filed: Oct. 25, 2001

(65) Prior Publication Data

US 2002/0176482 A1 Nov. 28, 2002

Related U.S. Application Data

(60) Provisional application No. 60/243,707, filed on Oct. 26, 2000.

(51) Int. Cl.⁷ .......................... H04B 17/00; H04B 15/00
(52) U.S. Cl. ........................ 375/224; 375/227; 375/219; 375/285; 455/296
(58) Field of Search ................................ 375/130, 140, 375/141, 219, 220, 222, 224, 227, 229, 233, 262, 267, 285, 295, 296, 299, 316, 341, 346, 347, 348, 349; 455/418, 63.1, 296; 714/774

(56) References Cited

U.S. PATENT DOCUMENTS

| | | | | |
|---|---|---|---|---|
| 5,228,058 A | * | 7/1993 | Ushirokawa et al. | 375/232 |
| 5,425,051 A | * | 6/1995 | Mahany | 375/132 |
| 5,594,946 A | | 1/1997 | Menich et al. | 455/54.1 |
| 6,044,485 A | * | 3/2000 | Dent et al. | 714/774 |
| 6,128,494 A | | 10/2000 | Rozmaryn | 455/436 |
| 6,131,013 A | * | 10/2000 | Bergstrom et al. | 455/63 |
| 6,157,683 A | * | 12/2000 | Daribi et al. | 375/341 |
| 6,173,166 B1 | * | 1/2001 | Whitecar | 455/296 |
| 6,185,418 B1 | * | 2/2001 | MacLellan et al. | 455/418 |
| 6,240,145 B1 | * | 5/2001 | Koizumi | 375/341 |
| 6,243,369 B1 | * | 6/2001 | Grimwood et al. | 370/335 |
| 6,282,661 B1 | * | 8/2001 | Nicol | 713/300 |
| 6,370,397 B1 | * | 4/2002 | Popovic et al. | 455/561 |
| 6,408,039 B1 | * | 6/2002 | Ito | 375/347 |
| 6,473,594 B1 | * | 10/2002 | Piirainen | 455/63 |
| 6,507,827 B1 | * | 1/2003 | Benson, Jr. | 706/14 |

FOREIGN PATENT DOCUMENTS

WO    WO 0048332    8/2000

* cited by examiner

*Primary Examiner*—Chieh M. Fan
(74) *Attorney, Agent, or Firm*—Koppel, Jacobs, Patrick & Heybl

(57) ABSTRACT

The invention monitors a communication channel and estimates its characteristics from time to time, thus providing a dynamic estimate of channel characteristics. Based on the channel characteristics, a control processor calculates a preferred configuration of digital (and optionally, analog) signal processing to best manage the available energy for the present channel characteristics. The selected configuration is then down-loaded into communication modules stored in extra memory during runtime. The communication modules preferably include a one or more of: a reconfigurable forward error correcting codec (with adjustable code lengths and a plurality of code choices); a reconfigurable interleaver with adjustable depth; a decision feedback equalizer (DFE) with a reconfigurable number of taps; maximum likelihood sequence estimator with an adjustable number of states; a frequency hopping coder with an adjustable number of hops or hop rate; and a direct-sequence (or direct sequence spread spectrum) codec with an adjustable number of chips per bit.

20 Claims, 2 Drawing Sheets

METHOD OF RECONFIGURATION OF RADIO PARAMETERS FOR POWER-AWARE AND ADAPTIVE COMMUNICATIONS

This application claims the benefit of provisional application No. 60/243,707, filed Oct. 26, 2000 and claims priority thereunder.

BACKGROUND OF THE INVENTION

1. Field of the Invention

This invention relates to wireless communications generally, and more specifically to power management for radio transceivers that employ digital coding and signal processing.

2. Description of the Related Art

Digital radio transceivers employ a variety of digital coding and signal processing methods to achieve communication through noisy and error prone channels. For example, forward error correction (FEC) and interleaving are both commonly used to compensate for channel fading. Such methods are extremely useful, but they come at a cost: increased power usage.

Consider an exemplary channel with no fading. In such a case, a simple radio configuration would suffice to achieve a bit error rate BER of 0.001% using binary phase shift keying at a transmit power of one 2.5 dBm over 100 meters with five dBm noise figure, zero dB nominal antenna gain, and five dBm link margin . In contrast, in the presence of fast fading a transmission can experience and additional 40 dB loss in signal to noise ratio which implies a necessary increase in transmitter power to 52.5 dBm or 178 W. To reduce the required power, most systems employ forward error correction and interleaving to combat the worst case fading scenario. However, such a point solution still results in unnecessary power consumption by the FEC codec and the interleaver in the case where the channel exhibits no fading. For the sake of illustration, assume that an FPGA implementation of a simple BPSK digital modem consumes 10 mw; a similar FPGA digital modem with FEC and interleaving would typically dissipate approximately one watt. Thus, if FEC and interleaving are used in all cases, 100 times more than necessary power would be consumed when the channel exhibits no fading.

In some applications unnecessary power consumption can be tolerated. However, many communications applications rely upon limited power sources such as batteries. In such applications a more efficient power management system is greatly to be preferred.

Current wireless systems already manage power to operate with high-energy efficiency and link performance by various means (e.g. power control). However, they are only point solutions and cannot adequately manage their power and performance for highly dynamic operation scenarios and environments.

SUMMARY OF THE INVENTION

In view of the above problems, the present invention provides an adaptive, reconfigurable radio architecture that allows software control of the radio signal processing by reconfiguring digital signal processing modules, and optionally by also reconfiguring analog signal processing modules.

The method of the invention monitors a communication channel and estimates its characteristics from time to time, thus providing a dynamic estimate of channel characteristics. Based on the channel characteristics, a control processor calculates a preferred configuration of digital (and optionally, analog) signal processing to best manage the available energy for the present channel characteristics. The selected configuration is then down-loaded into communication modules stored in extra memory during runtime. The communication modules preferably include one or more of: a reconfigurable forward error correcting codec (with adjustable code lengths, enabled or disabled states, and a plurality of code choices); a reconfigurable interleaver with adjustable depth; a decision feedback equalizer (DFE) with a reconfigurable number of taps; maximum likelihood sequence estimator with an adjustable number of states; a frequency hopping coder with an adjustable number of hops or hop rate; and a direct-sequence (or direct sequence spread spectrum) codec with an adjustable number of chips per bit. Each module is preferably well characterized so that the amount of energy required per information bit transmitted and received is known. Each module is adequately parameterized such that different instances may be reconfigured dynamically, in response to commands from the control processor, on a field programmable gate array (FPGA) or other type of reconfigurable hardware to provide appropriate signal processing for the dynamic channel conditions as measured.

An apparatus in accordance with the invention includes: a channel monitor which produces estimates of the communication channel's characteristics; a programmable processor arranged to receive estimates from said channel monitor, and programmed to compute preferred signal processing configuration based upon said estimates; at least one reconfigurable digital signal processing module, arranged to receive commands from said programmable processor and to reconfigure in response to said commands; and a radio transceiver, with inputs from said reconfigurable signal processing module and outputs to said reconfigurable signal processor module, for sending and receiving radio signals.

These and other features and advantages of the invention will be apparent to those skilled in the art from the following detailed description of preferred embodiments, taken together with the accompanying drawings, in which:

DETAILED DESCRIPTION OF THE INVENTION

Common acronyms are used extensively in the following description of the invention. For convenience, the following glossary is provided.

Glossary of Acronyms

SNR: signal-to-noise ratio
SIR: signal-to-interference ratio
SINR: signal-to-interference-and-noise ratio
MLSE: maximum likelihood sequence estimator
DFE: decision feedback equalizer
FH: frequency hopping
FHSS: frequency-hop spread-spectrum
DS: direct-sequence
DSSS: direct-sequence spread spectrum
SS: spread spectrum
GMSK: Gaussian minimum shift keying
CPM: continuous phase modulation QAM: quadrature amplitude modulation
RSSI: received signal strength indicator
BER: bit-error rate
PER: packet-error rate
IIP3: input third-order intercept point
RAM: random access memory
LNA: low noise amplifier
PA: power amplifier
NF: noise figure
FPGA: field programmable gate array
LMS: least mean square
RLS: recursive least square
TDMA: time division multiple access
FDMA: frequency division multiple access
CDMA: code division multiple access
CIR: channel impulse response
IS-95: Interim-Standard 95, a code-division multiple access standard, developed in the US.
GSM: Global System for Mobile Communications, a TDMA system, developed in Europe.

Figure 1:
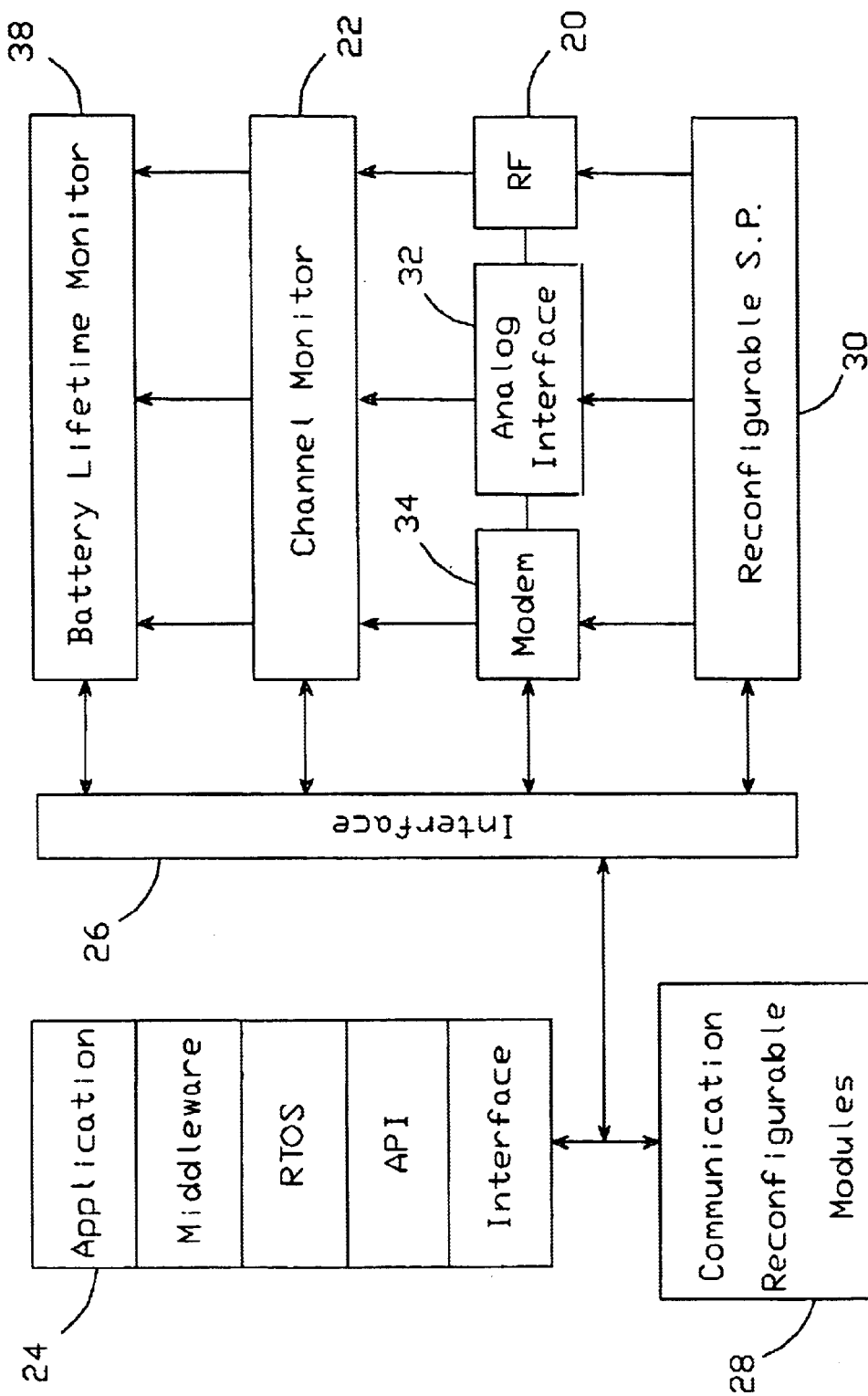
FIG. 1 is a block diagram of an reconfigurable radio apparatus in accordance with the invention.

FIG. 1 shows an apparatus in accordance with the invention. A radio transceiver module 20 is interfaced with a channel monitor 22 which provides estimates of channel conditions to control processor 24 via an interface 26. A plurality of reconfiguration modules are stored in external memory 28. The control processor 24 is programmed with a real time operating system, scheduler and middleware to select an appropriate signal processing radio configuration based upon current channel characteristics. Reconfiguration is accomplished by loading appropriate reconfiguration modules in a reconfigurable signal processor 30. In other words, a configurable signal processing (DSP) module 30 receives commands from the control processor 24 and reconfigures itself in response to such commands. Reconfigurable signal processing module 30 is linked to the radio transceiver 20, analog interface 32 modem 34, and processes the communication signals according to its selected configuration. Suitably, the signal processing module 30 is implemented on an FPGA, but it could also be realized on any reconfigurable hardware or software platform that has provisions to reconfigure its processing for different parameters, as discussed below. Preferably, a power supply condition monitor 38 is also provided to inform the control processor 24 of the current power supply conditions.

The modules stored in 28 (and implemented on signal processor 30) include one or more of the following:

a) DFE with reconfigurable number of taps
b) MLSE with reconfigurable number of states
c) Rake with reconfigurable number of fingers
d) Modulators with reconfigurable modulation types (e.g. GMSK, QAM, CPM, FSK) and constellation sizes.
e) FH transceivers with reconfigurable number of hops and hop rate
f) DS transceiver with reconfigurable number of chips per bit (i.e. processing gain).
g) Interleaver with reconfigurable depth and span, and types (e.g. convolutional or block).
h) FEC with reconfigurable code rate and types (e.g. block code, convolutional code, turbo code).

In a typical embodiment of the invention the reconfigurable signal processor module 30 is preferably realized using a field programmable gate array (FPGA) circuit. The method of the invention is not limited to only FPGA implementations but could of also be applied to any reconfigurable hardware platform that has provisions to reconfigure its processing for different parameters such as code rate, data rate, bandwidth, etc. In fact, adaptive reconfiguration of analog RF front end circuits could also be applied optionally for additional power savings.

An apparatus substantially as described is suitable for carrying out the method of the invention, as described below, for reconfiguring radio parameters for adapting radio performance to meet a given operation requirement (typically efficient power management).

Figure 2:
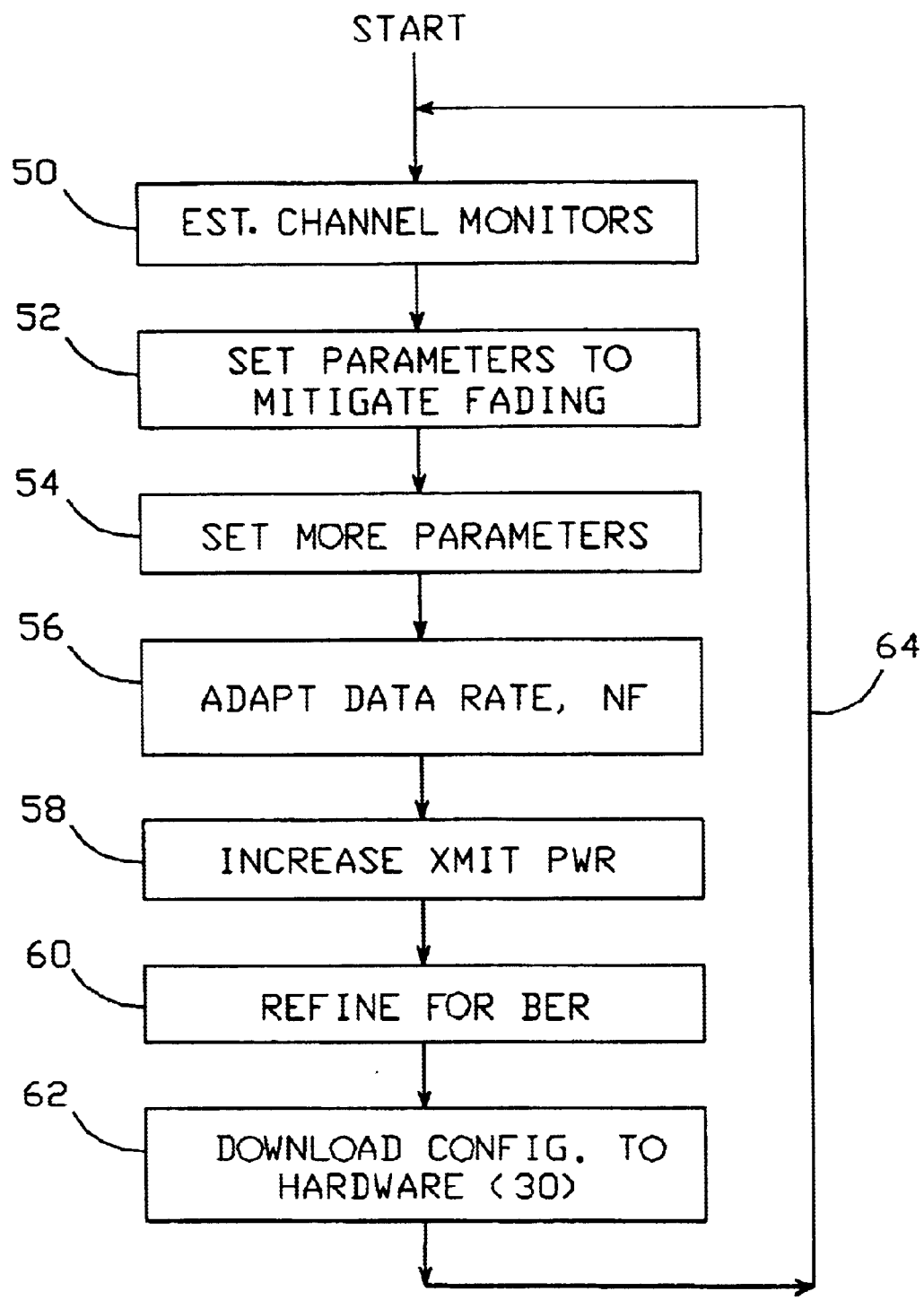
FIG. 2 is a flow diagram of a method in accordance with the invention.

The method of the invention, as shown in FIG. 2, is suitably executed under program control in software running on the control processor 24 (shown in FIG. 1). First (in step 50), the channel monitor 22 estimates channel characteristics based on current conditions of the communication channel. The details of suitable methods of estimation are discussed below in connection with table 1 and the more detailed description of the channel monitor 22.

Next (in step 52), based on the estimates of the channel impulse response, parameters of the reconfigurable signal processing blocks (stored in 28) are set to mitigate frequency selective fading. Such parameters preferably would include a decision feedback equalizers, a maximum likelihood sequence equalizer is, and the number of fingers on it a rake receiver. The parameters should be set according to the delay spread of the channel. The delay spread is determined from $\hat{h}(t)$ by setting a system adjustable threshold over which signal power is not considered in determining the time dispersion of the transmitted signal. For instance, the number of fingers in a Rake receiver could be set to span the delay spread of the channel; the MLSE could have the number of states determined by $2^L$ where L+1 is the length of the delay spread normalized to the symbol rate; and the number of taps in the DFE could be set to the length of the delay spread normalized to the symbol rate.

Next (step 54), Based on the estimated SIR, SNR, and SINR set parameters on the reconfigurable blocks that could mitigate interference and/or time-selective fading: including but not limited to interleaver, forward-error correction codec, frequency-hop transceiver, and direct-sequence spread-spectrum transceiver. Table 1 illustrates a possible set of constraints by which the SIR and SNR estimate could be used to determine the settings for the relevant reconfigurable blocks. Table 1 however does not represent the only method to determine the setting on the control parameters. Other control flow based on the channel estimates could be realized depending on the overall system requirements. For instance, it is also possible to do a relative comparison of the SIR and SNR for the cases where SIR is high and SNR is low or SIR is low and SNR is high. Note that thresholds V1 through V18 are adjustable parameters depending on the reconfigurable blocks used. Generally, V3–V6 are selected to be the region in which the BER performance meets the operational requirement at a given time.

TABLE 1

A possible constraint to direct the adjustment of reconfigurable parameters (in step 54)

| SIR Constraint | SNR Constraint | Control Adjustments |
|---|---|---|
| High value: SIR > V1 (Row 1) | High value: SNR > V2 | Proceed sequentially with the following adjustments. Note that sequencing depends on the system constraint being optimized and operational requirements. Thus, this is one possible sequencing that places higher priority on low |

TABLE 1-continued

A possible constraint to direct the adjustment of reconfigurable parameters (in step 54)

| SIR Constraint | SNR Constraint | Control Adjustments |
|---|---|---|
| | | power dissipation. Note that small steps should be used to decrease the parameters in this state so as to avoid a deadlock situation. Decrease transmit power Increase NF and/or data rate Perform the following until SIR falls between V3 and V4: Decrease chips/bit if DS mode is on Decrease hop rate and/or number of hopping frequencies. Decrease interleaver depth and span. If SNR is still higher than V2, then perform the following until SNR falls between V5 and V6: Decrease hop rate and/or number of hopping frequencies. Decrease interleaver depth and span accordingly Increase code rate Decrease interleaver depth and span accordingly If either SIR or SNR falls in conditions described in rows 3–5 then controls will transfer to the control procedure of the corresponding row. |
| High value: V3 ≦ SIR ≦ V4 (Row 2) | High value: V5 ≦ SNR ≦ V6 | Maintain current setting and go to step 60 |
| High value: V7 ≦ SIR ≦ V8 (Row 3) | Low value: V9 ≦ SNR ≦ V10 | Decrease coding rate Increase interleaving depth Frequency hop (increase hop rate) Go to Step 56 if all parameter adjustment has reached limits imposed by the underlying reconfigurable blocks. |
| Low value: V11 ≦ SIR ≦ V12 (Row 4) | High value: V13 ≦ SNR ≦ V14 | Frequency hop (increase hope rate and hopping frequencies). Adjust interleaving depth accordingly. Direct-sequence (increase chips per bit) Go to Step 56 if all parameter adjustment has reached limits imposed by the underlying reconfigurable blocks. |
| Low value: SIR < V15 (Row 5) | Low value: SNR < V16 | Perform control adjustments described in rows three and four of this table currently and repeat step 54. Go to row 3 if all parameter adjustment has reached limits imposed by the underlying reconfigurable blocks. |

Note that in the control settings applied in the cases represented by the third, fourth, and fifth rows of the Table 1), the control settings could be adjusted sequentially. For instance, in the case of high SIR and low SNR, the preferred method is to decrease coding rate first before increasing the interleaving depth. It is also possible to adjust the settings according to the estimated fading duration and fading rate based on simple rules, such as "choose an interleaver depth that is greater than the fading duration." Row three is repeated until either constraint in row two is met or until parameter adjustment has reached the range limit supported by the underlying reconfigurable blocks. In the former case, the control is transferred to step 60 and in the latter case control is transferred to step 56. If only estimates on SINR are available, then rows three and fourth are combined. That is the condition would be:

$$V17 \leq SINR \leq V18.$$

Next, in step 56, RSSI is used to adapt data rate (analog front-end bandwidth) and noise figure of the RF front-end. If RSSI.gtoreq.V19 and SIR falls between V11 to V12 or is less than V15 then increase NF until NE cannot increase any further or when SIR is raised to between V3 and V4 or greater than V1. Next if SNR is between V9 and V10 or less than V16 then decrease data rate or decrease NF until NF or data rate cannot be decreased any further or until SNR is raised to between VS and V6 or greater than V2. If either SNR or SIR still do not meet the operational requirement; i.e. within ranges specified in rows 1 and 2 of Table 1, then go to step 56.

Next, in step 58, transmit power is increased until a condition in the first or second row in Table 1 is met. If that condition is not met after highest transmit power possible is used then the method declares link failure. A transition to Step 54 or 56 should occur anytime the conditions described in rows 1-2 of Table 1 are met.

In step 60, adjustment is refined according to BER with same set of controls as portrayed in steps 52, 54, 56, 58 but now with SIR/SNR replaced by BER. The following regions will be used to perform fine adjustments:

TABLE 2

A possible constraint to direct the fine adjustment of reconfigurable parameters

| BER constraint | Control Adjustments |
|---|---|
| BER > V20 | Same as row 1 of Table 1. |
| V21 ≦ BER ≦ V22 | Same as row 2 of Table 1. |
| V23 ≦ BER ≦ V24 | Combine row 3 and 4 of Table 1 |
| BER < V25 | Same as row 4 of Table 1 |

The control is transferred back to steps 54, 56 or 58 if SIR falls outside of the range set by V3 and V4 or SNR falls outside of the range set by V5 and V6. The steps described above may also be thought of as states of a control algorithm.

While power is not explicitly mentioned in the reconfiguration procedure just described, it can be imposed at any time subject to the battery level indicator and estimates of the amount of energy required for the current and/or future configurations. If the battery level drops below a critical level, V26, then the system could either relax the performance constraint such that a lower power configuration could be obtained or enter a sleep/standby mode and only wakes up when critical task must be performed. In other words, the sleep mode is a means that the system could conserve the power so that it could still perform several critical communications before the battery dies out. A possible scenario involving reconfiguration of choice in PA type and modulation type was described in the approach section.

Also, separate from the main control loop, other independent control loops could be run to control reasonable independent parameters. The specific parameters would depend on the reconfigurable blocks available in the radio and the particular system application. For instance, as described earlier in the approach section, a control loop could be implemented that has two states, a normal state and an emergency state, where during the normal state when the battery level is above V26, GMSK modulation with non-linear amplification is used. However, as the battery level drops below V26 high order QAM modulation with linear amplification is used. Note that this control loop does not prevent the main control loop from utilizing the reconfigurable PA or reconfigurable modulator. For instance, the main loop could still adjust the data rate, if desired, by changing the constellation size.

Finally, in step 62, after the control processor has selected the most appropriate signal processing configuration and set parameters of the stored modules (stored in storage 28), the configuration is downloaded by command into the programmable signal processing hardware module 30, which controls the radio signal processing. From time to time, the estimate is refreshed and the method repeats, looping back via return path 64.

Methods of Estimating Channel Characteristics

Typical and suitable channel monitors can be summarized as follows:

TABLE 3

Summary of Channel Monitors

| Channel Monitors | Function |
|---|---|
| Signal-to-Noise Ratio (SNR) | Provides a fast estimation of SNR from which BER can be inferred. Based on this estimate the system can adapt the modulation order and the amount of error correction. |
| Bit Error Rate (BER) | Provides a direct but slow estimation of BER. The BER monitor can be used in conjunction with the SNR monitor to obtain a more accurate estimate of BER. |
| Received Signal Strength Indicator (RSSI) | Provides a fast estimation of the total received signal power and allows the system to adapt transmission power and noise figure. The SNR and BER monitors can be used jointly with RSSI for more precise adaptation. |
| Channel Impulse Response (CIR) | Provides an estimation of the multipath profile in the channel and allows the system to determine the amount of equalization required, e.g. number of Rake fingers. |
| Doppler Shift | Provides a fading rate estimation and allows the system to determine the amount of error correction and depth of the interleaver required. |

Estimates for these parameters can be calculated by the following methods, although the method of the invention is not limited and to specific methods of estimation.

SIR, SNR, SINR

If there are numerous interferers and especially if they are orthogonal to each other and to the desired signal then the following two methods could be applied to obtain an estimate of the signal-to-interference-and-noise ratio (SINR). Orthogonality approximation holds for code-division multiple access (CDMA) system. Note that other methods well known in the art can also be applied.

Assume a received signal: r(t)=A(t)c(t)+i(t)+n(t) where A(t) is the amplitude, c(t) is the desired signal (or user code if CDMA), i(t) is the interference, and n(t) is the noise process. then:

SINR:

$$SINR = \frac{|\hat{A}(t)|^2}{\sigma_N^2 + \sigma_I^2}$$

where $\hat{A}(t)$ is the estimated amplitude, and $\sigma_N^2$ and $\sigma_I^2$ are the variances of the noise and interference signal respectively.

Method 1

$$\hat{A}(t) = \frac{\int r(t)c^*(t)dt}{\int |c(t)|^2 dt}$$

$$\sigma_N^2 + \sigma_I^2 = |r(t) - \hat{A}(t)c(t)|^2$$

c*(t) denotes complex conjugate.

Method 2

$$\hat{A}(t) = E\{|r(t)|\}$$

$$\sigma_N^2 + \sigma_I^2 = (|r(t)| - E\{|r(t)|\})^2$$

E { } denotes the mean operator.

The following alternative methods could be applied in systems with few interferers, such as TDMA or FDMA. Assume a Received signal: r(t)=A(t)s(t)+I(t)g(t)+n(t) where s(t) is the pulse shaping used by the desired signal and g(t) is that used by the interferers. The SNR and SIR could be estimated by:

$$SNR = \frac{|\hat{A}(t)|^2}{\sigma_N^2}$$

$$SIR = \frac{|\hat{A}(t)|^2}{\sigma_I^2}$$

The parameters needed for the estimation of SNR and SIR are derived by the following equations:

$$\sigma_N^2 = (|r(t)| - E\{|r(t)|\})^2$$

$$\hat{A}(t) = \frac{\int r(t)s^*(t)dt}{\int |s(t)|^2 dt}$$

$$x(t) = |r(t) - \hat{A}(t)s(t)|^2$$

$$\sigma_I^2 = x(t) - \sigma_N^2$$

Implementation Issues

The above two methods could be implemented in the digital domain using datapath components well-known in the art, such as multipliers and adders. Certain simplifications could be achieved to eliminate division operations. For instance, the division needed to estimate the amplitude can be avoided by assuming that the filtered signal energy is a constant. Also, the division in the SNR and SIR computation can be eliminated by computing the estimates in units of dB and the log function can be implemented by approximation methods, such as power series, or by table loop up.

The inputs to the estimator could be based on pilot symbols or entire packets. Prediction of future SIR and/or SNR values could be implemented by using the LMS or RLS to train filter coefficients of the predictor implemented as a filter, e.g. auto-regressive. Kalman filtering techniques could also be employed. Prediction allows more time for the system to respond to changes in the channel parameters. In the simplest case, simple single pole filter with a forgetting factor or an FIR filter with windowing function (e.g. exponentially weighted) could also be used to obtain an average of the SIR or SNR. The predicted and/or weighted estimates would be used in the reconfiguration control discussed later.

Channel Impulse Response Estimation

Once again, we assume a Received signal: r(t)=h(t)*c(t)+ I(t)g(t)+n(t) where h(t) is the channel impulse response. Two methods are described though other techniques could also be employed.

In the first method channel impulse response is estimated according to the equation:

$$\hat{h}(t)=r(t)*c^*(-t) \quad 1)$$

In the second method Frequency domain response is estimated by means of pilot tones, which are well-known in the art. The channel response in the time domain is derived with an inverse FFT.

Note that to include the effect of h(t) in SIR and SNR we can use $\hat{h}(t)$ in the estimations of SIR and SNR described above.
In particular, s(t)*$\hat{h}(t)$ or c(t)*$\hat{h}(t)$would be used throughout in the estimation process instead of s(t)or c(t), respectively.

RSSI Estimation

Received signal strength is readily calculated according to:

$$\text{RSSI}=|r(t)|^2$$

BER/PER Estimation

Packet error rate (PER) can be estimated by estimating the number of times a packet is in error given a total number of packets sent. The error detection can be accomplished with an error detecting code, well known in the art, such as CRC.

The BER can be estimated from the PER as follows:
In one method, BER is calculated according to:

$$BER=1-(1-PER)^{1/L}$$

In an alternate method, BER can be calculated by:

$$PER/L \leq BER \leq PER$$

Other schemes are also possible. For example, the BER inferred from a syndrome obtained in a block code can be inferred from a Viterbi cumulataive metric, decoder, or inferred from the extrinsic/intrinsic metrics of a turbo codec.

Doppler Shift Estimation

Any of several known methods can be used to estimate velocity. For example, the apparatus can estimate velocity with on-board inertial sensors. alternatively, it could estimate velocity vector with on-board GPS and Kalman tracking. as another method, the apparatus could estimate fading duration and period of fade by sending out a series of small packets back-to-back and determine the loss statistics. A Large number of losses indicate a fade.

As yet another method, it is possible to estimate fading rate by means of a predictor similar to the predictor for SNR/SIR, except that in this case the signal power at the RF front-end is used as input to the predictor. The predictor filter coefficient will converge and generate fading time series from which the fading duration and fade period can be determined. Fading duration and fade period can be used to estimate the Doppler shift. More importantly, with respect to the reconfiguration control the parameters of interest are actually the fade period and fading duration. The received RF signal can be estimated by the following:

$$\text{Received input power} = \frac{|\hat{A}(t)|^2}{2|Z_{in}|^2 G_{RF}}$$

where $Z_{in}$ is the input impedance of the RF front-end and $G_{RF}$ is the total power gain of the RF front-end at the time the estimate is performed.

Note that it is possible to set a threshold V30 such that when the Received input power goes below it, the signal is said to be in a fade. In this way, the fading period and fade duration can be estimated by noting the amount of time the signal is below the threshold V30. Predictor could be avoided in this case.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of adaptively reconfiguring a radio architecture for power efficient or adaptive communications based on communication channel conditions, suitable for use in a reconfigurable radio which allows control of reconfigurable digital signal processing blocks with adjustable parameters, comprising the steps of:

estimating a signal to noise ratio (SNR) and signal-to-interference ration (SIR) based on a channel monitor;

estimating a channel impulse response;

based on the estimate of the channel impulse response, setting parameters of the reconfigurable digital signal processing blocks to mitigate frequency selective fading, wherein said step of setting parameters of the reconfigurable digital signal processing blocks comprises:

determining a delay spread from said channel impulse response by setting a system adjustable threshold over which signal power is not considered in determining a time dispersion of a signal; and setting the number of taps in a decision feedback equalizer (DFE) to the length of the delay spread normalized to a symbol rate; and based on the estimates of SIR and SNR, setting additional parameters of the reconfigurable digital signal processing blocks to mitigate interference, noise and time selective fading.

2. The method of claim 1, wherein said step of setting parameters of the reconfigurable digital signal processing blocks comprises:

adjusting the number of states of a maximum likelihood sequence equalizer with a reconfigurable number of states.

3. The method of claim 1, wherein said step of setting parameters of the reconfigurable digital signal processing blocks further comprises:

setting the number of fingers in a rake receiver.

4. The method of claim 1, wherein said step of setting additional parameters of the reconfigurable digital signal processing blocks comprises:

based on the estimated SIR and SNR, setting the code rate of a forward-error correction codec.

5. The method of claim 1, wherein said step of setting additional parameters of the reconfigurable digital signal processing blocks comprises reconfiguring a forward error correction codec.

6. The method of claim 5, wherein said forward error correction codec is reconfigurable to enabled or disabled states.

7. The method of claim 5, wherein said forward error correction codec is configurable to more than one code type.

8. The method of claim 1, wherein said step of setting additional parameters of the reconfigurable digital signal processing blocks further comprises:

setting the depth of an interleaver with a reconfigurable depth.

9. The method of claim 1, wherein said step of setting additional parameters of the reconfigurable digital signal processing blocks comprises reconfiguring a frequency hopping module with reconfigurable number of hops and hopping rate.

10. The method of claim 1, wherein said step of setting additional parameters of the reconfigurable digital signal processing blocks further comprises:

reconfiguring the number of chips per bit of a reconfigurable direct sequencing spread spectrum processing module.

11. The method of claim 1, wherein said steps of reconfiguring setting the parameters and setting the additional parameters of the reconfigurable signal processing blocks comprise programming a field programmable gate array (FPGA) circuit.

12. A digital radio capable of adaptively reconfiguring in response to changes in the characteristics of a communication channel, comprising:

a channel monitor which produces estimates of the communication channel's signal-to-noise ratio (SNR), signal-to-interference ratio (SIR), and channel impulse response characteristics;

a programmable processor arranged to receive estimates from said channel monitor, and compute a preferred signal processing configuration based upon said estimates;

at least one reconfigurable digital signal processing module, including at least one decision feedback equalizer (DFE) with an adjustable number of taps, arranged to receive commands from said programmable processor and to reconfigure in response to said commands; said processor further arranged to:

determine a delay spread from said channel impulse response estimate by setting a system adjustable threshold over which signal power is not considered in determining a time dispersion of a signal; and set the number of taps in said at least one DFE to the length of the delay spread normalized to a symbol rate; and a radio transceiver, with inputs from said reconfigurable signal processing module and outputs to said channel monitor, for sending and receiving radio signals.

13. The digital radio of claim 12, wherein said reconfigurable digital signal processing module comprises a forward error correction (FEC) codec.

14. The digital radio of claim 13, wherein said FEC codec is reconfigurable to enabled or disabled states in response to commands from said programmable processor.

15. The digital radio of claim 14, wherein said FEC codec is further reconfigurable to any of a plurality of codes, in response to commands from said processor.

16. The digital radio of claim 12, wherein said reconfigurable digital signal processing module comprises a maximum likelihood sequence equalizer with a reconfigurable number of states.

17. The digital radio of claim 12, wherein said reconfigurable digital signal processing module comprises an interleaver with a reconfigurable depth.

18. The digital radio of claim 12, wherein said reconfigurable digital signal processing module comprises a frequency hopping module with reconfigurable number of hops and hopping rate.

19. The digital radio of claim 12, wherein said reconfigurable digital signal processing module comprises a reconfigurable direct sequencing spread spectrum processing module with an adjustable number of chips per bit.

20. The digital radio of claim 12, wherein said reconfigurable digital signal processing module comprises a field programmable gate array circuit, interfaced to said processor and arranged to reconfigure in response to commands from said processor.

* * * * *